June 26, 1934.  J. L. ANDERSON  1,964,307
METHOD OF WELDING
Filed Nov. 15, 1930
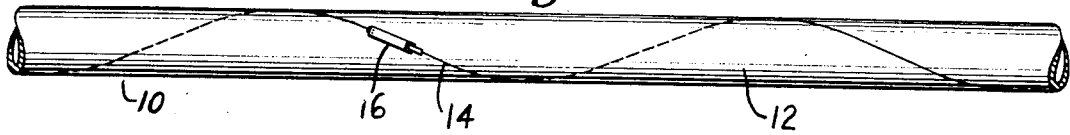
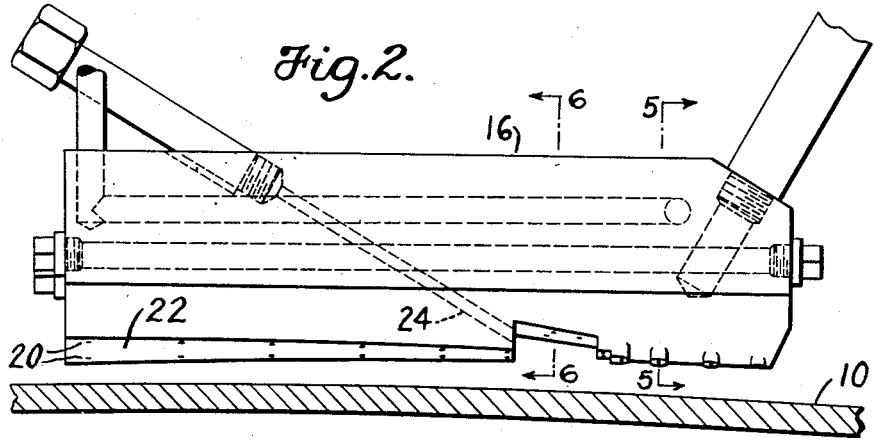
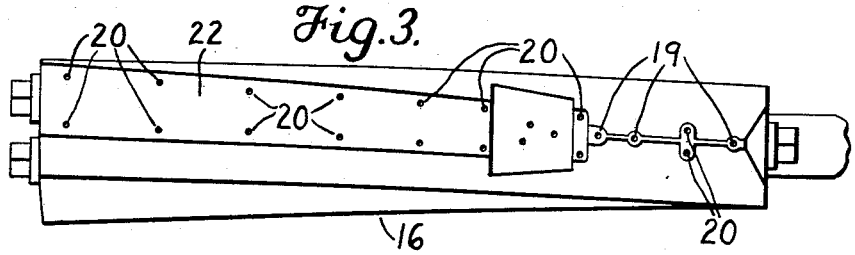
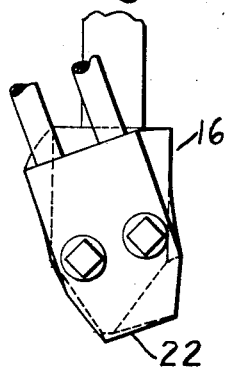
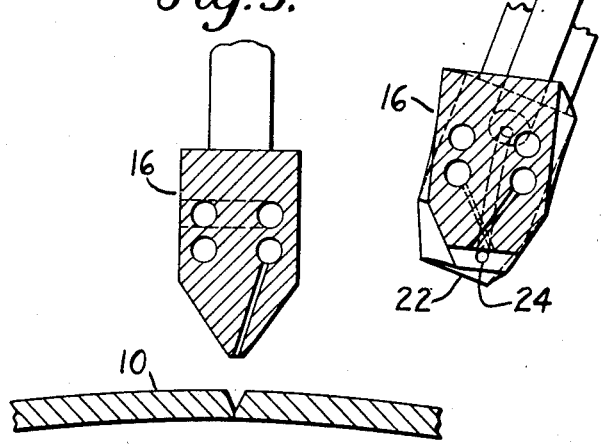
INVENTOR
*James L. Anderson*
BY
ATTORNEY Patented June 26, 1934

1,964,307

UNITED STATES PATENT OFFICE 1,964,307

METHOD OF WELDING

James L. Anderson, Tenafly, N. J., assignor to Air Reduction Company, Incorporated, New York, N. Y., a corporation of New York Application November 15, 1930, Serial No. 495,920

7 Claims. (Cl. 113—112)

This invention relates to a method of welding.

In welding sheet or plate metal, where the edges of sections thereof have been disposed in abutted relation, or where the edges have been lapped over, inter-fusion of these contacted portions is resorted to, in order integrally to bond the sections together. In the welding operations hereinafter dealt with, fusion by means of a plurality of high temperature flames, such as are projected by an oxy-fuel gas burner, simultaneously directed at the seam, and, specifically, the processes wherein the seam edges to be welded and the burner tip are moved relatively, preferably by mechanical means, and wherein the relative movement of edges and tip is carried out with a minimum of human control, and while the welding of the seam edges goes forward continuously, are contemplated.

The oxyacetylene torch has been found ideal for these purposes. The control of the reaction and the fine, non-porous condition of the finally solidified metal are factors making this method of welding desirable. In such welding operations it has been found that for increased efficiency positioning of the tips of the high temperature flames so that they impinge substantially perpendicularly to the seam and to the body of metal adjacent the seam is an important factor.

While not absolutely essential that the jets be perpendicular to the seam margins in all planes, still it is intended that the jets each impinge so that an imaginary plane through each jet, parallel to the seam edge, would be approximately perpendicular to the surface of the metal against which the jet is directed. In cases where the jets are not perpendicular to the metal in all planes, it is desired that their tendency should be in the direction of the cold metal advancing toward the flames for fusion thereby, so that such metal may be preheated by the burning envelope gases. Preferably, however, the flames are disposed to impinge upon the metal so that all planes therethrough would be substantially perpendicular to the metal heated. When so arranged, the burning gases, after impact, will be spread out substantially uniformly in all directions, thus tending to effect uniformity in heating metal spaced away from the point of application of the flame jets. Likewise, the tendency of the flame jets to pile up molten metal in any specific direction in which the jets are directed is reduced. Finally, since, as is well-known, the hottest portion of flame jets of the type herein discussed is at the tip of the inner cone, positioning such flames to impinge away from the perpendicular to the metal to be heated would result in a side, and not the tip, of the flame being brought fully to bear upon the metal to be fused, with consequent loss in the difference in temperatures which would have worked for a speedier and more efficient heat interchange between gas and metal. Since a portion of the extremely hot area of the flame jets adjacent the flame tip would be turned away from the metal to be heated, and heat from such area would naturally flow away, rather than toward, the metal being heated, maximum heat transfer from hot gas to metal would not be effected. In other words, where the flame jets have been spaced the minimum distance away from the metal necessary to permit maximum breaking down of the fuel used to the intermediate products of combustion, hydrogen and carbon monoxide, which is the stage at which the highest temperature attainable results, the greater the contact of the hot gas point with the metal to be heated, the more efficient and effective will be the welding.

It is an object of this invention to provide a method of welding in which oxy-fuel gas flames are utilized and are disposed to impinge upon the metal to be fused, so that, no matter what may be the contour of the surface to be heated or the particular arrangement of the seam or similar path along which welding is to be effected, the angle of contact of flame jet and metal will tend to realization of the greatest efficiency.

In the course of welding together plane sheets in abutment or overlapping relation, or in welding seams formed by bending the opposite parallel edges of a metallic sheet into contact to form a straight line seam extending lengthwise of the metallic member and substantially in the same plane throughout, it has been a matter of practice to dispose the torch tip so that jets of flame issuing therefrom were disposed at the most effective angle to the metal, and the torch or the metal was fed along so that the flame jets and metal were continuously in the same angular relationship. In welding other than straight line seams, as where the seam is not disposed in the same plane throughout, the tip used for straight line seams has previously been applied, with relatively inefficient and uneconomical results. As can well be understood, only a small number of the flames in such case would act most effectively, most of the flames being spaced away from the metal so as to apply to the metal being heated, not the very high temperature of the inner cone, but the heat of the outer cone in which the gases are of a much lower temperature, due to the quantity of inactive gases absorbing heat energy, as, for instance, the nitrogen in the air necessary to burn the hydrogen envelope gases and the water vapor produced by such combustion. The burner is robbed of efficiency by such spacing of the burner flames away from the metal to be heated.

Further, where the orifices in such a burner are drilled to direct the jets substantially at right angles to a plane surface, and when such burner is disposed with relation to a non-planar surface, few if any of the jets will meet the metal at right angles, but will tend to drive gases and molten metal along the downwardly tending portions of the surface.

It is an object of this invention to provide a method of welding non-rectilinear seams and also seams not disposed within the same plane throughout, in which the flames are positioned in a constant relation to such seams and at the proper angle thereto at all times. The ends of the flame jets are uniformly and simultaneously controlled through a single means to bring the same within a uniform effective distance from the seam.

The invention has reference to the welding of seams following the contour of cylindrical, or similarly shaped bodies, as where two sections of tubing are brought into end to end abutment and the seam formed therebetween is then welded closed. A specific application of the invention is involved in the welding of the seam formed by twisting sheet or plate metal into a helix and bringing side edges into abutment. The seam then takes the form of a helical line, winding along the surface of the tube formed by the twisted metal; and in order to carry out the present invention, specially constructed apparatus is provided to weld such seams, which are neither rectilinear, nor is any portion thereof disposed in the same plane.

More broadly, it is an object of this invention to provide a method by which the welding of circumferential or helical seams may be accomplished with maximum efficiency and economy by disposing the flame jets in uniform relation to the seam operated upon, each flame jet being disposed so as to be capable of the same, or substantially the same, effectiveness as the other flame jets.

The invention has particular application to those operations wherein welding of seams is substantially continuous and progressive, relative motion of flame jets and the work being effected, preferably mechanically, and especially those wherein, the torch remaining stationary, the work is fed past it. In the case of circumferential seams, the two associated pipe sections are rotated together, while in the case of helical seams the twisted metal is both rotated and moved longitudinally, the seam threading past the torch, as it were; in either case, the seam remains positioned immediately beneath the torch, not moving laterally away from the torch throughout the operation. In each of these cases, and also in other cases of non-rectilinear and non-planar seams to which the invention may be applied, the torch tip is shaped and the orifices for the flame jets drilled and disposed so that when the tip is positioned properly relatively to the seam to be welded the jets will each impinge upon the seam at substantially the same angle thereto and each at a uniform distance away therefrom.

Other objects of this invention will be apparent from the description and drawing, which form a part hereof.

The invention is not intended to be restricted to the illustrative construction and arrangements of parts herein shown and described, nor to the specific methods of operation, nor to the precise details thereof, as the same may be modified in various particulars without departing from the spirit and scope of the invention, a practical embodiment of which has been herein illustrated and described without attempting to show all the various forms and modifications in which the invention might be embodied.

In the accompanying drawing, in which is disclosed apparatus embodying and capable of effecting the method involving the invention:

Fig. 1 is a plan view of a pipe section, illustrating the formation of a helical seam therein, and the disposition of a torch tip, embodying the invention, relatively thereto;

Fig. 2 is an elevational view of a torch tip embodying the invention, shown disposed above a seam such as that illustrated in Fig. 1;

Fig. 3 is a bottom plan view of the tip shown in Fig. 2;

Fig. 4 is an elevational view of the tip as seen from the welding end thereof;

Fig. 5 is a transverse sectional view, on the line 5—5 of Fig. 2; and

Fig. 6 is a transverse sectional view on the line 6—6 of Fig. 2.

On the drawing, the apparatus is shown as applied specifically for welding helical seams, formed as set forth above. It is, however, to be understood that this operation is not the only one within the scope of the invention. In the particular case shown, a pipe or tube 10 has been formed by bending or twisting sheet or plate metal into the helical convolutions 12, the side edges of the sheet being brought into contact or into opposition to form a seam 14. A burner tip 16 is shown positioned to direct flame jets at the metal of the seam margins to heat and interfuse such metal, in the well-known manner. The disposition of the flame jet orifices 20 is substantially the same as that set forth in my Patent No. 1,516,486, dated November 25, 1924, in which spaced rows of flames are directed so that they impinge substantially perpendicular against the surface of the metal, not directly upon or between the seam edge faces, but somewhat back from such seam edges, for the purposes set forth in said patent. However, some flame jets may be given directions other than those of the grouping as a whole, as, for instance, the orifices 19 which direct jets toward the seam edges.

Since the helical seam 14 is not in the same plane, or in the same straight line, throughout, in order to position the tips of the flame jets in uniform relation to the seam, that is, uniformly spaced away from the metal and at a substantially uniform angle of incidence, it becomes necessary to bend and/or twist the body of the tip so that the face 22 thereof, from which the burner orifices 20 open, will follow substantially the line of the seam. Such deformation of the tip results in positioning such orifices substantially in accordance with the plan set forth in my aforesaid patent, that is, a line of gas jets will be disposed on each side of the seam, the jets impinging directly upon the metal of the seam margins, and not passing directly downwardly through any opening that may exist at the seam.

It is further desired that the face 22, when the tip is arranged at the distance away from the work required for efficient welding, have a curved or twisted contour practically concentric with or otherwise closely following that of the pipe or tube to be welded. The drilling of orifices 20 in such case, and except for those instances above noted, is radial of face 22, or substantially perpendicular thereto, so that the jets will impinge substantially at right angles to the metal surface toward which they are directed. The passage 24 through which wire may be fed, where metal is to be added during welding, for well known purposes, is likewise positioned so that the proper angle of incidence of the wire with the jets and the weld will be assured. By this construction and arrangement, the jets issuing from the orifices will all be uniformly disposed relatively to the seam margins to be heated; that is, the jets will all be arranged in uniformly spaced relation to the surface of the metal attacked and at a common angle of incidence, no matter what portion of the seam is being heated. In all constructions of this character embodying the invention herein, a single passage or a plurality of passages, fed from a single passage, feeds the various orifices with the mixed gases.

In a preferred embodiment of the invention, a burner tip of the type above referred to is manufactured by first providing a burner tip of the type set forth in my patent, aforesaid. The body of the tip is then subjected to a bending and twisting action by means of suitable rollers or dies, so that the body will be twisted, both laterally and vertically. The particular shaping desired would, of course, be determined by the particular seam to be welded; that is, by the pitch of the helix, the diameter of the pipe, and also by the length of the tip. If desired, the drilling of the jet orifices may be accomplished after the bending and twisting operation. Preferably, the straight-bodied tip is completed, substantially as to all its details, such as the drilling of the orifices and of the passages for wire-feed, before the body thereof is subjected to bending stress.

The body is then subjected to the required stress, so that the body will be bent substantially uniformly throughout, simultaneously positioning the burner orifices to conform to a preliminarily determined seam line. The vertical biasing of the body will tend to bring the direction of the jets issuing from the orifices and the wire passing through the passage into conformity with the desired direction, that is, one in which the orifices will be directed to impinge upon the metal of the seam margins in a plane substantially perpendicular to the plane of the metal and the wire will be heated and then enter the molten metal at such angle as to set up the minimum disturbance. The twisting of the body metal will bring the jets to impinge upon the body metal, so that the direction thereof will be perpendicular to the metal in all directions. Slight imperfections or deviations in the orifices, produced by the bending or twisting operation, may be corrected by re-drilling after the deforming operation. The usual drills for forming the orifices may be utilized for this purpose.

I claim:

1. A method of pipe or tube fabrication, in which a continuous, regularly formed seam extending longitudinally along and following the curvature of the pipe or tube section is to be welded progressively, which includes, simultaneously projecting at portions of the seam margins a plurality of flame jets outside of the seam and spaced along the length of the seam, directing the successive jets against the outside surface of the pipe or tube substantially perpendicular to said outside surface, and causing simultaneous longitudinal and rotational movement of the pipe or tube relative to the jets while maintaining the relation of the jets and seam unchanged.

2. A method of pipe or tube fabrication, in which a continuous, non-rectilinear, regularly formed seam in pipe or tube is to be welded progressively, which includes, simultaneously projecting at portions of the seam margins a plurality of flame jets outside of the seam and spaced along the length of the seam, directing the successive jets against the outside surface of the pipe or tube at substantially uniform angles to the surface with which they contact, causing a combined longitudinal and rotational relative movement of the pipe and the jets so that said jets weld the seam progressively along its length, and maintaining the relation of the jets and seam margins substantially unchanged during their relative movement.

3. A method of progressively welding a continuous, regularly formed seam between metallic portions, substantially no two portions of which are in the same plane, which includes, simultaneously projecting at the seam a plurality of flame jets outside the seam and spaced along the length of the seam, directing the successive jets against the outside surface of said metallic portions so that all jets will impinge at a substantially uniform angle with the seam and the surface of the metallic portions forming the seam, and causing relative movement of said portions and said jets in the direction in which the seam extends, while maintaining the relation of jets, seam and portions substantially unchanged.

4. A method of progressively fusing metal along a non-rectilinear path not lying in a single plane, said method including projecting a plurality of oxy-fuel gas flame jets at the metal to be fused, with the jets spaced along the length of the path and the portions of said jets at which the highest temperature is attained positioned at substantially the same distance from the respective portions of the surface of the metal against which the respective jets are projected, directing the respective jets substantially perpendicular to the respective portions of the metal surface with which they contact, and causing relative movement of the jets and the metal surface in the direction of said non-rectilinear path without substantial change in the relation of the jets and the metal surface.

5. A method of progressively welding together metallic members by fusing together adjacent edges of such members, disposed along a helical path, said method including projecting a plurality of oxy-fuel gas flame jets at the metal to be fused, with the jets spaced along the path to be welded and with the portions of said jets at which the highest temperature is attained positioned at substantially the same distance from the respective portions of the surface of the metal against which the respective jets are projected, directing the respective jets so that their angles with relation to the respective portions of the metal surface toward which they are directed are substantially uniform, and causing simultaneous longitudinal and rotational relative movement of the jets and the metal surface without substantial change in the relation thereof.

6. A method of progressively welding together metallic members by fusing together adjacent edges extending along a curved path, the points of which do not lie in a common plane, said method including projecting a plurality of oxy-fuel gas flame jets at the metal to be fused, with the jets spaced along the path to be welded and with the portions of said jets at which the highest temperature is attained positioned at substantially the same distance from the portions of the surface of the metal against which the respective jets are projected, and causing simultaneous longitudinal and rotational relative movement of the jets and the metal surface without substantial change in the relation thereof.

7. The method of welding the helical seam of a spirally wound pipe or tube comprising, projecting a seamwise-extended system of high temperature flame against the metal to be welded, spacing said system of flame with respect to the metal so as to heat the pipe with equal effectiveness throughout the length of said system of flame, producing simultaneous rotational and longitudinal relative movement of the pipe and the system of flame so that the seam is progressively fused along its length, and maintaining the spacing of the flame system with respect to the surface of the metal substantially unchanged during said relative movement.

JAMES L. ANDERSON.